United States Patent Office 3,513,223
Patented May 19, 1970

3,513,223
PHENOL-FORMALDEHYDE RESINS IN NEEDLE FORM
Charles L. Smart, Millington, and Gordon W. Calundann, Newark, N.J., assignors to Celanese Corporation, New York, N.Y., a corporation of Delaware
No Drawing. Filed Nov. 13, 1967, Ser. No. 682,577
Int. Cl. C08g 37/06, 5/06
U.S. Cl. 260—838                                    12 Claims

ABSTRACT OF THE DISCLOSURE

Phenol-formaldehyde resin needles are produced by impregnating a low density oxymethylene polymer fiber with a hydroxy-aromatic compound such as phenol in the presence of an acid catalyst such as stannic chloride and then heating the resulting impregnated fiber to form phenol-formaldehyde resin needles.

BACKGROUND OF THE INVENTION

This invention relates to phenol-formaldehyde resins or polymers, and more particularly to phenol-formaldehyde resins in needle form and to processes for their preparation.

There is a growing awareness of the value of fiber and filament fragments, sometimes called needles, as reinforcing agents in a variety of synthetic resin or plastic carrier materials. Incorporating various filler materials in molding compositions is common practice to produce molded articles which possess improved mechanical strength. Among the more common fibrous filling and reinforcing materials are various metals, glass, asbestos, and nylon. The addition of these materials to synthetic resin molding compositions provides a greater tensile, flexural, and other strength characteristics to the molded article which could not ordinarily be obtained by using the unreinforced resin or plastic material.

For example, metal fibers and filaments may be ultilized to strengthen plastic resinous compositions and will enhance the ability of articles molded from these compositions to dissipate heat. Fine metal crystal needles, sometimes called metal whiskers, have demonstrated tensile strengths in excess of what one would expect from conventional sheet and rod stock. However, these metal whiskers are not without certain drawbacks.

Part of the hesitancy in using metal fibers is that they are not readily available due to their experimental nature and high cost. Other problems incurred when using metal fibers as reinforcing agents in plastic or resinous compositions involve the incompatibility of the metal fiber with the resin carrier composition which results in poor bond strength between the fiber reinforcement and the resin carrier and in an inefficient overall structure.

Glass and asbestos fibers also suffer from their incompatibilty with certain resinous carrier materials. Attempts have been made to coat glass and asbestos fiber with a material more compatible with the composition to be reinforced, but this method is inherently expensive and does not always give desired results. In addition to their incompatibility, glass and asbestos fibers do not normally have the high mechanical strength which is needed to reinforce certain resins.

Synthetic polymer fibers such as those fibers made of polyamide or nylon, or of acrylonitrile-vinyl chloride copolymers, sold under the trademark Dynel, have also been employed in the form of fibers or filaments to reinforce molded articles. These synthetic plastic fibers are generally more readily available and hence cheaper than their metal whisker counterparts. Providing their physical identity is not altered, plastic or resinous fibers will lend toughness and improved impact strength to molded products. These plasti fibers can be used as long filaments or in small chopped length.

Plastic reinforcing fibers heretofore known, however, like their metal and glass counterparts, suffer from various disadvantages in certain resin carrier environments. Many plastic or resinous fibers do not have a sufficient degree of affinity towards the resin carrier material to be reinforced, and the weak bond between the fiber and the carrier material is often a problem in many situations. Further, some plastic fibers tend to lose their identity when subjected to high processing temperatures, organic solvents, or strong acids.

Fibrous reinforcing materials in general can be used to reinforce a variety of resin carrier materials, such as the phenol-formaldehydes, polyesters, alkyds, alkyd-silicons, and others. These reinforced resins can be molded into a variety of products including skylights, awnings, wall and ceiling panels, luggage, furniture, and automobile parts.

SUMMARY OF THE INVENTION

Accordingly, the primary object of the present invention is to provide a process for the preparation of phenol-formaldehyde resins in needle form and the needles resulting therefrom, which have improved modulus, thermal stability, and chemical resistance, and which are uniquely suitable as a particularly compatible reinforcing material in a variety of resin carrier compositions.

Other objects of the present invention will be apparent to those skilled in the art from the following more detailed description.

In accordance with the present invention, the above objects are attained by impregnating or permeating a low density oxymethylene polymer fiber with a hydroxy-aromatic compound and an acid catalyst and heating the resulting impregnated fiber to yield phenol-formaldehyde resin needles.

The resulting needles or staple fibers of phenol-formaldehyde can be used to reinforce a variety of resin carrier materials. Particularly good results are obtained when reinforcing phenol-formaldehyde resin structures, as they will exhibit a high degree of affinity toward the phenol-formaldehyde needles of the present invention.

DESCRIPTION OF THE PREFERRED EMBODIMENTS

(A) Oxymetyhlene polymer fiber

The oxymethylene polymer fibers which are used in the present invention to produce the needles of phenol-formaldehyde resins are prepared from oxymethylene polymers, and preferably, oxymethylene copolymers.

Oxymethylene polymers in general have been known for many years. They may be prepared by the polymerization of anhydrous formaldehyde or trioxane, which is a cyclic trimer of formaldehyde, by homo- or co-polymerizing trioxane, for example, in the presence of certain fluoride catalysts such as a catalyst comprising boron fluoride coordinate complexes with organic compounds as described in U.S. Pat. No. 2,989,506 of Doneld E. Hudgin and Frank M. Beradinelli.

Other methods of preparing the oxymethylene polymers are disclosed by Kern et al. in Angewandte Chemie, 73(6), 177–186 (March 21, 1961), and in Sittig. "Polyacetals: What You Should Know," Petroleum Refiner, 41, 11, 131–170 (November, 1962); and in U.S. Pat. No. 3,027,352 of Cheves T. Walling, Frank Brown and Kenneth W. Bartz.

As mentioned, the oxymethylene polymer fiber is preferably prepared from oxymethylene copolymers which are normally defined as having a structure comprising recurring units represented by the general formula

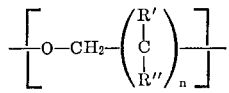

wherein $n$ represents an integer from 0 to 4, and representing 0 (zero) in from 60 to 99.9 percent of the recurring units; and $R'$ and $R''$ represent inert substituents, that is, substituents which are free from interfering functional groups and will not induce undesirable reactions. Preferably, the oxymethylene copolymers have a structure comprising oxymethylene and oxyethylene recurring units wherein from 60 to 99.9 percent, e.g., from 60 to 70 to 99.9 percent of the recurring units are oxymethylene units.

The oxymethylene copolymer from which the fiber is produced may be defined more specifically as a normally solid, substantially water-insoluble copolymer, the repeating or recurring units of which consist essentially of recurring units represented by the general formula

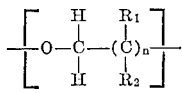

wherein each $R_1$ and $R_2$ is selected from the group consisting of hydrogen, lower alkyl and halogen-substituted lower alkyl radicals and wherein $n$ is an integer from zero to four, and $n$ being zero in from 85 to 99.9 percent of the recurring units. Each lower alkyl radical preferably has from one to two carbon atoms.

The above-described oxymethylene copolymers may be produced by copolymerizing trioxane together with at least one comonomer, and particularly together with a cyclic ether having at least two adjacent carbon atoms.

In general, the cyclic ethers employed in making the oxymethylene copolymer are those represented by the general formula

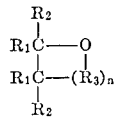

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to three. Each lower alkyl and haloalkyl radical preferably has from 1 to 2 carbon atoms.

A particularly preferred class of comonomers are those cyclic ethers having the structure

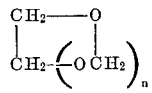

wherein $n$ represents an integer from zero to two.

Preferably ethylene oxide and 1,3-dioxolane are used as the comonomer; however, other cyclic ethers that may be employed are 1,4-dioxane; trimethylene oxide; tetramethylene oxide; pentamethylene oxide; 1,2-propylene oxide; 1,2-butylene oxide; 1,3-butylene oxide and 2,2-di-(chloromethyl)-1,3-propylene oxide.

Still other specific comonomers which may be used are 1,3 - dioxane; 1,3,5 - trioxepane; beta - propiolactone; gamma-butyrolactone; neopentyl formal; pentaerythritol diformal; paraldehyde; tetrahydrofuran and butadiene monoxide.

These and other commonly used comonomers may be copolymerized with the trioxane to form the desired oxymethylene copolymers, the term "copolymer" as used herein being intended to include terpolymers and higher polymers. For example, the above cyclic ethers may be used with polyepoxides and similar materials to form terpolymers as disclosed in U.S. patent application Ser. No. 153,720, filed Nov. 20, 1961, by W. E. Heinz et al. now abandoned.

The oxymethylene copolymers which are used to form the fiber of the present invention may also contain or have incorporated therein other interspersed monomeric units such as those derived from lactones, carbonates, cyclic acid hydrates or ethylenically unsaturated compounds such as styrene, diformal ether, vinyl acetate, vinyl methyl ketone or acrolein as disclosed in the aforementioned Kern et al. article.

In forming the oxymethylene copolymers of the present invention, the comonomer is usually used in amounts of about 0.1 to about 20 weight percent, based on the weight of trioxane, and preferably in amounts of about 0.1 to about 10 weight percent. When more than one comonomer is used the same weight limitations apply.

The trioxane or formaldehyde may be homo- or copolymerized in any of the well known ways to produce the oxymethylene polymers from which the low density oxymethylene fiber polymer is prepared, as hereinafter more fully explained. For example, trioxane may be polymerized with a comonomer such as ethylene oxide in the presence of a catalyst at a temperature in the range of from about 10° C. to about 115° C. on a continuous, semi-continuous or batch basis in a mass or solution polymerization system. Suitable trioxane polymerization catalysts include inorganic fluorine-containing catalysts, such as antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride and fluosulfonic acid. Other catalysts recently found to be effective in addition to the boron fluoride coordinate complexes disclosed above are thionyl chloride, ethane sulfonic acid, phosphorous trichloride, titanium tetrachloride, ferric chloride, zirconium tetrachloride, aluminum trichloride and stannic chloride. Stannous chloride, previously reported to have no catalytic activity has also been found to be an effective catalyst.

Desirably, the oxymethylene polymers are end-capped by any of the methods well known to those skilled in the art, e.g., by acylation or esterification after polymerization or even during the polymerization reaction by the use of selected chain transfer agents such as methylal. Stabilizers such as chain-scission inhibitors, antioxidants and the like may also be added to or incorporated in the polymer in any convenient manner if so desired.

The resulting oxymethylene polymers are thermoplastic materials having a melting point of at least about 150° to 160° C., and normally are millable at about 190° C. The oxymethylene polymers have an inherent viscosity value of about 1.2 to about 2.0 (measured at 25° C., in a 98% p-chlorophenol-2% α-pinene by weight solvent solution).

The oxymethylene fibers are formed from the above mentioned oxymethylene polymers by any suitable method, as for example, by extrusion or melt spinning at a temperature in the range of 175° to 235° C., preferably 190° to 220° C.

One important aspect of the present invention is that the oxymethylene polymer fiber must have a density of below about 1.2 grams/cc., e.g., about 0.5 to 1.0 grams/cc., and preferably about 0.5 to 0.9 grams/cc., in order to form the phenol-formaldehyde needles of the present invention. With a density of below about 1.2 grams/cc., the hydroxy-aromatic compound is able to enter or impregnate the interior structure of the polymer fiber, as hereinafter more fully explained, so as to be able to react and form phenol-formaldehyde resins in needle-like form.

If the density of the fiber is, however, above about 1.2 grams/cc., the hydroxy-aromatic compound will react essentially at the exterior surface of the oxymethylene polymer fiber and merely from a phenol-formaldehyde coating around the oxymethylene polymer fibers. Thus, since oxymethylene polymer fiber melts at a relatively low temperature, is flammable, and is depolymerized rather readily by acids, a coated fiber would still inherently retain many of these disadvantages. The phenol-formaldehyde resin needles, however, have improved thermal and chemical stability, along with a chemical structure or make-up which would conform more closely to the structure of resins it might reinforce, thus fostering greater compatibility between reinforcing agent and carrier resin.

Normally, oxymethyene polymer has a density above 1.4 grams/cc., for example, about 1.41 to about 1.43 grams/cc., thereby necessitating a treatment such as stretching the fiber to reduce the density to the desired range. A normal oxymethylene polymer fiber can be drawn or stretched at a ratio of about 1.1 to 6, preferably about 1.2 to 3, at temperatures of about 25° to 110° C., preferably about 60° to 100° C.

While stretching the fiber to its desired density is preferred, other methods can be used to produce an oxymethylene fiber of the desired density such as leaching a soluble component, such as a water soluble salt, contained in the fiber.

Any oxymethylene polymer fibers having the above density requirements may be employed herein i.e., from substantially continuous to staple fibers. Preferably, substantially continuous fibers, having any convenient size such as of about 2 to 50 d.p.f., and preferably 2 to 10 d.p.f., are used (d.p.f.—denier per filament).

The cross sectional shape of the oxymethylene polymer fiber can be of any form from round or oval to polygonal.

As used herein, the term "fiber" is meant to be inclusive of and interchangeable with the terms strand, filament, yarn and the like.

(B) Hydroxy-aromatic compound

As stated previously, the above described low density oxymethylene polymer fiber is contacted or impregnated with a phenolic or hydroxy-aromatic compound.

Any hydroxy-aromatic compound having at least three reactive hydrogen atoms or free positions on the aromatic nucleus, including mono- and poly-nuclear aromatics, and having one or more hydroxy groups attached directly to the aromatic nucleus may be employed. Preferably, mononuclear aromatics having one or more hydroxy groups attached directly to the benzene nucleus are used, i.e., the phenols such as phenol itself, cresols, xylenols, and resorcinol. Poly-nuclear hydroxy-aromatics such as naphthols and bis-phenols can also be conveniently employed.

The reactive hydrogen atoms or free positions on the aromitic nucleus are in the positions ortho and para to the hydroxy substituent, e.g., the 2, 4 and 6 positions in phenol and the 2, 4, 6 and 8 positions in 1-naphthol. At least three of these positions must contain only hydrogen so that a reaction between the hydroxy-aromatic compound and formaldehyde can occur, as hereinafter more fully explained, to form a three dimensional polymer or space polymer.

Especially preferred are hydroxy-aromatic compounds or phenolics represented by the formula:

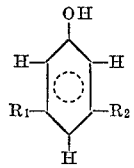

wherein each $R_1$ and $R_2$ is selected from the group consisting of hydrogen, hydroxyl, amino, alkyl- and dialkylamino, alkyl, oxyalkyl, and haloalkyl radicals. Each alkyl, alkyl- and dialkyl-amino, oxyalkyl, and haloalkyl preferably has from 1 to 5 carbon atoms.

Suitable representative phenols which may be employed herein are phenol; the ortho and para unsubstituted isomers of cresol and xylenol; resorcinol, and 1, 3, 5-trihydroxybenzene or phloroglucinol.

Since the above hydroxy-aromatics are normally solids, they are generally, prior to being contacted with the oxymethylene polymer fiber, dissolved in any volatile organic solvent, such as methanol, isopropyl alcohol and acetone, which are suitable for dissolving the hydroxy-aromatics contemplated herein. Particularly preferred solvents are methanol and isoproply alcohol.

Conventionally, the solutions contain about 10 to 95 weight percent of hydroxy-aromatic compound, preferably 65 to 85 weight percent.

(C) Acid catalyst

Acid catalysts which are acid in the Lewis sense may be used in the present invention. The acid catalyst must be able to effect depolymerization of the oxymethylene polymer fiber and catalyze the condensation reaction between the hydroxy-aromatic compound and formaldehyde, as hereinafter more fully explained.

Suitable representative Lewis acid catalysts are the halides of tin, aluminum, iron, boron, phosphorus, zinc, titanium, and antimony. For example, the chlorides of tin, aluminum, iron, phosphorus, zinc, antimony and titanium are suitable. Also, the fluorides of boron, aluminum, iron, zinc and titanium may be used. Bromides and iodides of the above also may be used.

Other inorganic acids such as hydrochloric, sulfuric, phosphoric, perchloric, hydrofluoric and fluoroboric acids may be used.

Organic acids which may be used include p-toluene sulfonic acid, acetyl sulfuric acid, glacial acetic acid, and oxalic acid.

The boron trifluoride complexes with ethers and organic acids are also suitable.

Preferably, stannic chloride and aluminum chloride are used.

The acid catalyst is usually present in an amount of about .05 to 5.0 weight percent based on the weight of hydroxy-aromatic solution, and preferably in an amount of about 0.1 to 0.5 weight percent.

Acid catalysts are desirably present during the impregnation of the oxymethylene polymer fiber with the hydroxy-aromatic compound which is preferably in solution, and must be present during the subsequent heating of the impregnated fiber, for the acid catalyst will aid in the depolymerization of the fiber and catalyze the condensation reaction between the hydroxy-aromatic, such as phenol, and formaldehyde which is generated from the depolymerization of the oxymethylene polymer fiber.

The acid catalyst can, however, be impregnated in or distributed throughout the low density polymer fiber prior to, concurrently with, or after the impregnation of the fiber with the hydroxy-aromatic compound. Preferably and conveniently, the fiber can be impregnated with both the hydroxy-aromatic and acid catalyst at the same time to effect a proportionate distribution and an efficient condensation reaction.

The hydroxy-aromatic compound, such as phenol, and the acid catalyst are contacted with the low density oxymethylene polymer fiber by any convention type of contacting method, e.g., a solid-liquid contacting method such as dipping or soaking the fiber in a solution containing the hydroxy-aromatic compound and the acid catalyst at a temperature in the range of about 10° to 50° C. preferably 20° to 30° C., for about ten seconds to one hour.

The methods of contacting can be either static or dynamic. For example, specified amounts of hydroxy-aromatic solution and acid catalyst can be placed in a vessel or reactor along with the fiber for a specific time—a static method; or, the low density oxymethylene polymer fiber could be conveyed through or sprayed with a solution of hydroxy-aromatic and acid catalyst—a dynamic method.

The contacting can be made under an inert atmosphere of nitrogen, argon or the like if particularly oxygen sensitive reactants are being used, e.g., the amino phenols or the polyhydroxy phenols. Preferably, atmospheric pressures are employed; however higher or lower pressure may be used if desired.

Typically, the fiber is merely dipped into a bath of the hydroxy-aromatic solution and catalyst under ambient conditions.

An amount of about 5 to 30 weight percent of the hydroxy-aromatic compound based on the weight of the polymer, and preferably an amount of about 10 to 15 weight percent, should be absorbed by or impregnated in the low density oxymethylene polymer fiber.

In addition, an amount of about .001 to 2.0 weight percent of the acid catalyst based on the weight of the polymer, and preferably an amount of about .01 to 1.0 weight percent, should be absorbed by or impregnated in the low density oxymethylene polymer fiber.

The impregnated fiber is then heated to form the phenolformaldehyde resin through an acid catalyzed condensation reaction between the hydroxy-aromatic compound and formaldehyde generated from the depolymerized fiber. The impregnated fiber is heated to a significant extent, however, only after removal from the impregnating bath or spray. If the fiber is heated while in contact with an excess of solvent, it will depolymerize and dissolve in the solution, and therefore no needles would be formed in this way. In general, depolymerization of the impregnated fiber should be minimized while in contact with any solvent bath.

After impregnating, the fiber is heated to a temperature of about 70° to about 200° C., and more particularly, to a temperature of about 100° to about 150° C. The impregnated fiber can be heated at these temperatures for up to about three hours, and more preferably for about five minutes to about one hour.

The temperature and duration of the heating step will vary with the nature of the hydroxy-aromatic or formaldehyde-reactant used, but with phenol itself it is usually at least 100° C. and for at least five minutes.

The heating of the impregnated fiber can conveniently take place at atmospheric pressure but sub- or superatmospheric pressure can be used. Again, an inert atmosphere would only be necessary when dealing with oxygen-sensitive reactants.

One method of heating the impregnated fiber is to place it in an oven and heat it for the desired duration. If, after heating, the fibers are wet or damp with solvent, they may be further treated such as by evaporation techniques to dry them, although the use of a volatile solvent eliminates or substantially lessens the need for further drying.

Further, the impregnated fiber will normally break up into shorter lengths upon heating. Thus, a substantially continuous oxymethylene polymer fiber can be impregnated with hydroxy-aromatic solution and acid catalyst and the fiber will subsequently break into fragments or needles which may be of a length directly suitable for reinforcing a resin carrier material. Otherwise, the needles can be further subdivided or altered into a suitable physical form.

The heated, impregnated fiber is now phenol-formaldehyde resin in needle form. The impregnating of the low density oxymethylene polymer fiber with the hydroxy-aromatic compound and acid catalyst with subsequent heating of the impregnated fiber is believed to partially depolymerize the oxymethylene polymer and generate formaldehyde, which then reacts with the hydroxy-aromatic compound in an acid catalyzed condensation reaction to form phenol-formaldehyde resin throughout the remaining oxymethylene polymer fiber. The relatively low density of the oxymethylene fiber allows the hydroxy-aromatic of phenolic compound, particularly when in solution, and the acid catalyst to distribute or permeate throughout the fiber which results after heating in a novel fiber or needle.

Of course, it is within the scope of the present invention to impregnate the fiber with more than one hydroxy-aromatic compound and more than one acid catalyst.

The present invention is further illustrated by the following example:

EXAMPLE

A length of oxymethylene fiber having a density below about 1.2 grams/cc. wrapped taut on flat a metal frame was immersed at room temperature for fifteen minutes in a solution containing 50 grams of methanol, 150 grams of phenol, and one gram of stannic chloride. The frame was removed with the impregnated fiber still intact. Excess solution was removed from the fiber by shaking and holding the frame aloft to allow it to drain. The fiber, still wrapped about the frame, was then heated in an oven at 100° C. for about forty-five minutes to form the phenol-formaldehyde resin needles. While being heated the fiber broke into many segments or needle-like portions.

The phenol-formaldehyde resin needle prepared in the above example is insolvent in organic solvents, and retains its shape in sulfuric acid at 100° C. This is a relatively low cost, high modulus needle which has a high degree of affinity towards a variety of resin carrier materials, and in particular, the phenolics.

Phenolic resins, and in particular phenol-formaldehyde resins, have achieved wide commercial success and can be molded or otherwise shaped into a wide variety of products such as luggage and automobile parts. The addition of filler materials improves the physical properties of the molded or shaped phenol-formaldehyde resin article. As pointed out, previous fibrous filler materials such as glass fibers have lacked a suitable affinity for the phenol-formaldehyde carrier resin. The phenol-formaldehyde resin needles of the present invention, however, will provide a highly compatible reinforcement to its resin carrier material.

Further, particularly good results are obtained when reinforcing a phenol-formaldehyde resin structure by choosing a like or "brother" phenol-formaldehyde resin needle. For example, when reinforcing a resorcinol-formaldehyde resin structure, a resorcinol-formaldehyde needle may be used.

Of course, the reinforced structure can also include, if desired, various other fillers, pigments, stabilizers and the like.

The principles, preferred embodiments, and modes of operation of the present invention have been described in the foregoing specification. The invention which is intended to be protected herein, however, may be practiced other than as described without departing from the scope of the appended claims.

What is claimed is:

1. A method for producing a phenol-formaldehyde resin in needle form comprising impregnating a low density oxymethylene polymer fiber with a hydroxy-aromatic compound having at least three reactive hydrogen atoms or free positions on the aromatic nucleus and at least one hydroxy group attached directly to the aromatic nucleus and a Lewis acid catalyst, said oxymethylene polymer fiber having a density adequate for allowing said hydroxy-aromatic compound and said catalyst to enter the interior structure of said fiber; and heating the impregnated fiber to form a phenol-formaldehyde resin in needle form.

2. The method of claim 1 wherein said low density oxymethylene polymer fiber has a density below about 1.2 grams/cc.

3. The method of claim 2 wherein said hydroxy-aromatic compound has at least three reactive hydrogen atoms and at least one hydroxy group attached directly to the aromatic nucleus, said reactive hydrogen atoms in the positions ortho and para to said hydroxy group; and wherein said Lewis acid catalyst comprises at least one halide selected from the group consisting of tin, aluminum, iron, boron, phosphorus, zinc, antimony and titanium halides.

4. The method of claim 3 wherein said low density oxymethylene polymer is a normally solid, substantially water-insoluble copolymer, the repeating units of which consist essentially of recurring units represented by the general formula:

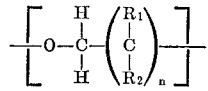

wherein each $R_1$ and $R_2$ is selected from the group consisting of hydrogen, lower alkyl and halogen-substituted lower alkyl radicals, each lower alkyl radical having from one to two carbon atoms, and wherein $n$ is an integer from zero to four, and $n$ being zero in from 85 to 99.9 percent of the recurring units.

5. The method of claim 4 wherein said low densnity oxymethylene polymer fiber has a density of about 0.5 to 1.0 grams/cc.

6. A method for producing a phenol-formaldehyde resin in needle form comprising:

impregnating a low density oxymethylene polymer fiber with a hydroxy-aromatic compound having at least three reactive hydrogen atoms or free positions on the aromatic nucleus and at least one hydroxy group attached directly to the aromatic nucleus and a Lewis acid catalyst, said low density oxymethylene polymer fiber being a normally solid, substantially water-insoluble copolymer, the repeating units of which consist essentially of recurring units represented by the genenral formula:

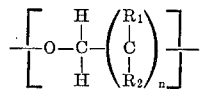

wherein each $R_1$ and $R_2$ is selected from the group consisting of hydrogen, lower alkyl and halogen-substituted lower alkyl radicals, each lower alkyl radical having from one to two carbon atoms, and wherein $n$ is an integer from zero to four, and $n$ being zero in from 85 to 99.9 percent of the recurring units, and said poylmer having a density of about 0.5 to 1.0 grams/cc.;

said hydroxy-aromatic compound impregnated in the oxymethylene polymer fiber in an amount of about 5 to 30 weight percent based on the weight of the polymer; and said Lewis acid catalyst impregnated in the oxymethylene polymer fiber in an amount of about .001 to 2 weight percent based on the weight of the polymer;

and heating said impregnated fiber to a temperature of about 70° to 200° C. for about five minutes to about three hours to form a phenol-formaldehyde resin in needle form.

7. The method of claim 6 wherein said hydroxy-aromatic compound has at least three reactive hydrogen atoms and at least one hydroxy group attached directly to the aromatic nucleus, said reactive hydrogen atoms in the positions ortho and para to said hydroxy groups; and wherein said Lewis acid catalyst comprises at least one halide selected from the group consisting of tin, aluminum, iron, boron, phosphorus, zinc, antimony and titanium halides; and wherein said polymer fiber is impregnated with a solution of the hydroxy-aromatic compound containing said catalyst.

8. The method of claim 7 wherein said hydroxy-aromatic compound is phenol and said acid catalyst is stannic chloride.

9. A phenol-formaldehyde resin in needle form produced in accordance with claim 6.

10. A resin carrier containing the needle of claim 9 as a reinforcement.

11. The composition of claim 10 wherein said resin carrier is a phenol-formaldehyde resin.

12. The composition of claim 11 wherein said resin carrier is the same phenol-formaldehyde resin as the needle reinforcement.

References Cited

UNITED STATES PATENTS

| 3,290,261 | 12/1966 | Goldblum | 260—67 |
| 3,382,293 | 5/1968 | Price | 260—838 |
| 3,385,827 | 5/1968 | Fischer et al. | 260—67 |

SAMUEL H. BLECH, Primary Examiner

J. C. BLEUTGE, Assistant Examiner

U.S. Cl. X.R.

260—53, 54, 57, 67, 2.5, 844